United States Patent
Mulder et al.

(10) Patent No.: US 11,130,682 B2
(45) Date of Patent: Sep. 28, 2021

(54) ALUMINA ABRASIVE PARTICLES USED FOR AUTOMOTIVE FINISHING COMPOSITIONS

(71) Applicant: SAINT-GOBAIN CERAMICS & PLASTICS, INC., Worcester, MA (US)

(72) Inventors: Carlijn Lucinde Mulder, Minneapolis, MN (US); James Berberian, Holden, MA (US); Stephen Bottiglieri, Whitinsville, MA (US); James A. Salvatore, Sutton, MA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 719 days.

(21) Appl. No.: 15/897,117

(22) Filed: Feb. 14, 2018

(65) Prior Publication Data
US 2018/0230021 A1     Aug. 16, 2018

Related U.S. Application Data

(60) Provisional application No. 62/459,400, filed on Feb. 15, 2017.

(51) Int. Cl.
*B24D 3/02*     (2006.01)
*C01F 7/02*     (2006.01)
(Continued)

(52) U.S. Cl.
CPC .............. *C01F 7/023* (2013.01); *B01J 6/001* (2013.01); *C01F 7/441* (2013.01); *C09G 1/02* (2013.01);
(Continued)

(58) Field of Classification Search
USPC .......................................... 51/293, 307, 309
See application file for complete search history.

(56) References Cited

U.S. PATENT DOCUMENTS

| | | | | |
|---|---|---|---|---|
| 4,301,037 A | * | 11/1981 | Sanchez | B01J 35/10 502/303 |
| 5,284,809 A | * | 2/1994 | Van Dijen | C01F 7/441 501/127 |

(Continued)

FOREIGN PATENT DOCUMENTS

| | | |
|---|---|---|
| CN | 103332718 A | 10/2013 |
| CN | 106044809 A | 10/2016 |

(Continued)

OTHER PUBLICATIONS

Office Action dated Aug. 31, 2020, directed to JP Application No. 2019-564388; 6 pages.

(Continued)

*Primary Examiner* — James E McDonough
(74) *Attorney, Agent, or Firm* — Morrison & Foerster LLP

(57) ABSTRACT

The present disclosure is directed to an alpha alumina powder having a specific surface area, a specific crystallite size, and a specific particle size distribution for use in abrasive polishes, and method of making such powder. The method of making the alpha alumina powder can include calcining an aluminum oxide precursor powder at a temperature of 800-1500° C. and milling the calcined powder to the specific particle size distribution. The alpha alumina powder disclosed herein can quickly enable high removal rate with undiminished aesthetic quality when used in abrasive polishes.

28 Claims, 1 Drawing Sheet

(51) Int. Cl.
   *C09G 1/02* (2006.01)
   *B01J 6/00* (2006.01)
   *C01F 7/44* (2006.01)
   *B24D 3/00* (2006.01)
   *B24D 11/00* (2006.01)
   *B24D 18/00* (2006.01)

(52) U.S. Cl.
   CPC ...... *C01P 2002/60* (2013.01); *C01P 2004/51* (2013.01); *C01P 2004/61* (2013.01); *C01P 2004/62* (2013.01); *C01P 2006/10* (2013.01); *C01P 2006/12* (2013.01); *C01P 2006/14* (2013.01); *C01P 2006/16* (2013.01)

(56) References Cited

U.S. PATENT DOCUMENTS

| | | | | |
|---|---|---|---|---|
| 5,302,368 | A * | 4/1994 | Harato | C01F 7/023 423/111 |
| 6,403,526 | B1 | 6/2002 | Lussier et al. | |
| 8,241,375 | B1 * | 8/2012 | Park | C09K 3/1463 51/307 |
| 2003/0185746 | A1 | 10/2003 | Kajihara et al. | |
| 2004/0197263 | A1 | 10/2004 | Wang | |
| 2011/0256051 | A1 | 10/2011 | Sawano et al. | |
| 2014/0158613 | A1 | 6/2014 | Weimer et al. | |

FOREIGN PATENT DOCUMENTS

| | | |
|---|---|---|
| JP | H6-171931 A | 6/1994 |
| JP | 2006-124622 A | 5/2006 |

OTHER PUBLICATIONS

Auerkari, P. (1996) "Mechanical and physical properties of engineering alumina ceramics", Technical Research Centre of Finland, Espoo, Finland; 26 pages.

International Search Report and Written Opinion dated Apr. 30, 2018 directed to International Application No. PCT/US18/18225; 12 pages.

Croquesel et al. (Jun. 21, 2016). "Direct microwave sintering of pure alumina in a single mode cavity: Grain size and phase transformation effects," Acta Materialia 116: 53-62.

Extended European Search Report dated Nov. 25, 2020, directed to EP Application No. 18754768.2; 5 pages.

First Office Action dated Dec. 2, 2020, directed to CN Application No. 201880012148.3; 21 pages.

Second Office Action dated Jun. 17, 2021, directed to CN Application No. 201880012148.3; 6 pages.

* cited by examiner

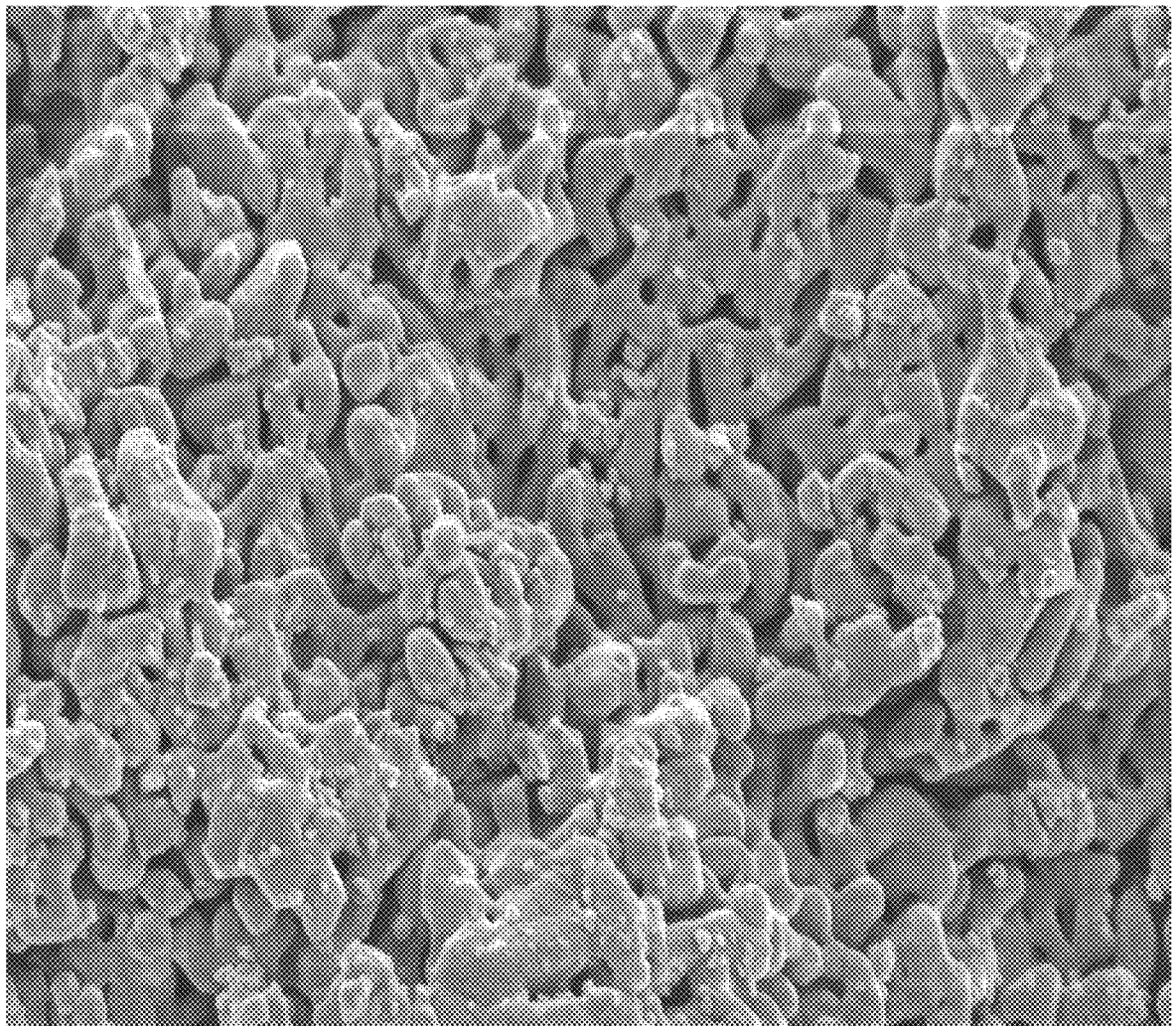

ALUMINA ABRASIVE PARTICLES USED FOR AUTOMOTIVE FINISHING COMPOSITIONS

REFERENCE TO RELATED APPLICATIONS

This application claims the benefit of U.S. Provisional Application No. 62/459,400, filed Feb. 15, 2017, the entire contents of which are incorporated herein by reference.

FIELD OF THE INVENTION

This disclosure relates to alumina powder and applications using said powder. More particularly, this disclosure relates to alpha alumina powder having a specific surface area, a specific primary crystallite size, a specific porosity, and a specific particle size distribution for use in abrasive polishes.

BACKGROUND OF THE INVENTION

A clear coat is a glossy and transparent coating usually sprayed on top of a colored paint coat of an automotive (e.g., cars, boats, airplanes, etc.). The clear coat can form the final interface with the environment. Accordingly, besides providing a desired gloss to the automobile, the clear coat can also provide protection from UV rays that cause the paint on the car to fade and provide protection to the color coat from various forms of harmful chemicals, bird droppings, acid rain, minor scratches, etc. After the clear coat is applied, the clear coat can have some imperfections or be uneven, thereby affecting the gloss of the automotive. As such, the clear coat can be buffed with an abrasive polish, also known as a compound, to level out the clear coat. This abrasive polish can include coarse abrasive particles. These coarse abrasive particles can remove very fine layers of the clear coat, thereby leveling the clear coat. Besides leveling the clear coat, the abrasive polish can be used to remove scratches in the clear coat. This process of removing a scratch can be a multi-step process. For example, larger coarse abrasive particles can be used to first level the clear coat and then small fine abrasive particles can be used to obtain a high finish. Accordingly, the process of polishing the clear coat can be very time consuming.

SUMMARY OF THE INVENTION

Applicants have discovered a powder that can be used in an abrasive polish to obtain a high removal rate with improved gloss and haze in a short amount of time. Specifically, Applicants have discovered an alpha alumina powder having a specific surface area, a specific primary crystallite size, a specific porosity, and a specific particle size distribution which can quickly enable high removal rate with undiminished aesthetic quality when used in abrasive polishes.

This disclosure refers to both particles and powders. These two terms are equivalent, except for the caveat that a singular "powder" refers to a collection of particles. The present invention can apply to a wide variety of powders and particles. A "particle" and an "aggregate" can be interchangeably used throughout. An aggregate/particle can comprise a plurality of crystallites that can be sintered together. These crystallites can be sintered weakly or strongly.

Reference to "about" a value or parameter herein includes (and describes) variations that are directed to that value or parameter per se. For example, description referring to "about X" includes description of "X". In addition, reference to phrases "less than", "greater than", "at most", "at least", "less than or equal to", "greater than or equal to", or other similar phrases followed by a string of values or parameters is meant to apply the phrase to each value or parameter in the string of values or parameters. For example, a statement that the weight percent of alpha alumina can be at least about 75 wt %, about 80 wt %, or about 85 wt % is meant to mean that the weight percent of alpha alumina can be at least about 75 wt %, at least about 80 wt %, or at least about 85 wt %.

As used herein, the singular forms "a," "an," and "the" are intended to include the plural forms as well, unless the context clearly indicates otherwise. It is also to be understood that the term "and/or" as used herein refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Additional advantages will be readily apparent to those skilled in the art from the following detailed description. The examples and descriptions herein are to be regarded as illustrative in nature and not restrictive.

BRIEF DESCRIPTION OF THE DRAWINGS

Exemplary embodiments are described with reference to the accompanying FIGURE, in which:

The single FIGURE illustrates a high resolution SEM micrograph showing the microstructure of an alumina powder described herein.

DETAILED DESCRIPTION OF THE INVENTION

Applicants have discovered a powder that can be used in an abrasive polish to obtain a high removal rate in a short amount of time. Specifically, Applicants discovered that the combination of an alpha alumina powder having a specific surface area, a specific primary crystallite size, a specific porosity, and a specific particle size distribution can quickly enable high removal rate with undiminished aesthetic quality when used in abrasive polishes.

Aluminum Oxide Precursor Starting Material

The starting material to form the alumina powder can be an aluminum oxide precursor powder. In some embodiments, the aluminum oxide precursor powder can be an aluminum hydroxide powder. In some embodiments, the aluminum hydroxide powder can include gibbsite, boehmite, diaspore, or a combination thereof. In some embodiments, the aluminum oxide precursor powder can be an aluminum oxide powder containing a transitional aluminum oxide phase. For example, the aluminum oxide precursor powder can include γ, η, θ, χ, κ, and/or δ phase aluminum oxide.

The particles of the aluminum oxide precursor powder can comprise a plurality of crystallites having an average primary crystallite size of less than about 5 microns, about 2 microns, about 1 micron, or about 0.5 microns. In some embodiments, the particles of the aluminum oxide precursor powder can comprise a plurality of crystallites having an average primary crystallite size of about 0.01-5 microns, about 0.05-2 microns, about 0.075-1 microns, or about 0.1-0.5 microns. In some embodiments, each of the crystallites have a primary crystallite size of less than about 5 microns, about 2 microns, about 1 micron, or about 0.5 microns. In some embodiments, each of the crystallites have a primary crystallite size of about 0.01-5 microns, about 0.05-2 microns, about 0.075-1 microns, or about 0.1-0.5 microns.

The aluminum oxide precursor powder can also have a specific surface area of at least about 100 m$^2$/g, about 200 m$^2$/g, about 250 m$^2$/g, about 275 m$^2$/g, or about 300 m$^2$/g. In some embodiments, the aluminum oxide precursor powder can have a specific surface area of about 10-400 m$^2$/g, about 30-350 m$^2$/g, or about 50-320 m$^2$/g. In addition, the aluminum oxide precursor powder can have a density of at least about 2 g/cm$^3$, about 2.2 g/cm$^3$, about 2.5 g/cm$^3$, about 3 g/cm$^3$, about 3.25 g/cm$^3$, about 3.5 g/cm$^3$, about 3.75 g/cm$^3$, or about 4 g/cm$^3$.

Heat Treatment of Aluminum Oxide Precursor Powder to Form Alpha Alumina Powder

In order to produce an alumina powder, the aluminum oxide precursor powder described above can be calcined. When an aluminum oxide precursor powder is calcined, aluminum oxide can be formed. However, aluminum oxide can be in a variety of phases including γ, η, θ, χ, κ, δ, and/or α phase. Each phase of aluminum oxide can have a unique crystal structure and properties. In addition, the production of aluminum oxide tends to produce a multi-phase aluminum oxide (i.e., consisting of several phases of aluminum oxide rather than one individually). However, Applicants heat treatment process of the aluminum oxide precursor powder can produce a powder that has a majority alpha aluminum oxide (i.e., alpha alumina). Alpha aluminum oxide is the most chemically stable phase of aluminum oxide and also has the highest hardness, therefore making the alpha phase suitable for use in an abrasive compound.

Various devices can be used in the calcination of the aluminum oxide precursor powder including a rotary kiln, a static kiln, a muffle furnace, an elevator kiln, or a pusher kiln, among others. Although various devices can be used to calcine the aluminum oxide precursor powder, there are main components of the calcination. These main components can include, for example, the calcination temperature and the calcination time. Due to the various phases of aluminum oxide that can occur, the main components of the calcination can allow the calcined powder to mostly be in the alpha alumina phase. For example, the calcined alumina powder can be at least about 50 wt %, about 60 wt %, about 70 wt %, about 75 wt %, about 80 wt %, about 85 wt %, about 90 wt %, about 95 wt %, about 96 wt %, about 97 wt %, about 98 wt %, about 99 wt %, about 99.5 wt %, about 99.9 wt %, or 100 wt % alpha alumina. The remaining weight percent of the calcined alumina powder can be aluminum oxide in phases other than alpha.

The temperature of the calcination process can be about 700-1600° C., about 800-1500° C., about 900-1400° C., about 1000-1300° C., or about 1100-1300° C. Outside of these temperature ranges, the alpha alumina content of the calcined powder might be outside of the alpha alumina weight percentages disclosed above. The calcination time can be about 1-48 hours, about 12-48 hours, about 24-48, or about 24 hours. A longer calcination time can elicit more crystallite grain necking or abnormal growth. In addition, the calcination can take place in an atmosphere of air, vacuum, or an inert gas.

The particles of the calcined alumina powder can comprise a plurality of crystallites having an average primary crystallite size of less than about 5 microns, about 2 microns, about 1 micron, or about 0.5 microns. In some embodiments, the particles of the calcined alumina powder can comprise a plurality of crystallites having an average primary crystallite size of less than about 0.01-5 microns, about 0.05-2 microns, about 0.075-1 microns, or about 0.1-0.5 microns. In some embodiments, each of the crystallites have a primary crystallite size of less than about 5 microns, about 2 microns, about 1 micron, or about 0.5 microns. In some embodiments, each of the crystallites have a primary crystallite size of less than about 0.01-5 microns, about 0.05-2 microns, about 0.075-1 microns, or about 0.1-0.5 microns. The structure of the powder can ultimately be altered and impact the millability and ultimately the size distribution achieved. The hardness and breakdown behavior of the aggregated crystallites can also be altered and change performance during use. Thus, maintaining a small primary crystallite size can provide greater flexibility in achieving the final desired particle size distribution.

The calcined alumina powder can also have a specific surface area (SSA) of about 1-20 m$^2$/g, about 5-15 m$^2$/g, about 5-12 m$^2$/g, about 6-11 m$^2$/g, about 7-10 m$^2$/g, or about 8-9 m$^2$/g. The SSA can be a good singular metric which combines alumina phase, structure, and size. If the SSA is much higher than these disclosed ranges, the alumina phase is likely to be lower than alpha and the removal rate of such powder in an abrasive polish would be decreased. If the SSA is much lower than these disclosed ranges, the alumina powder can have very coarse alpha particles which can cause significant scratching and therefore remove the clear coat in its entirety. In addition, the calcined alumina powder can have a density of greater than or equal to about 1 g/cm$^3$, about 2 g/cm$^3$, about 3 g/cm$^3$, about 3.8 g/cm$^3$, about 3.9 g/cm$^3$, about 3.97 g/cm$^3$, about 3.98 g/cm$^3$, or about 4 g/cm$^3$. If the density is much lower than these disclosed ranges, the alumina phase is likely to be lower than alpha and the removal rate of such powder in an abrasive polish would be decreased.

The calcined alumina powder can also be porous. Specifically, the calcined alumina powder can be mesoporous and macroporous. The mesoporosity and the macroporosity can be quantified by the pore volume and the pore size. For example, at least a portion of the calcined alumina powder can be mesoporous with a pore volume of about 0.001-0.5 cm$^3$/g, about 0.001-0.3 cm$^3$/g, 0.005-0.25 cm$^3$/g, about 0.01-0.2 cm$^3$/g, or about 0.05-0.15 cm$^3$/g and a pore size of about 2-50 nm, about 2-20 nm, about 3-15 nm, or about 5-10 nm. In addition, at least a portion of the calcined alumina powder can be macroporous with a pore volume of about 0.01-0.2 cm$^3$/g, about 0.03-0.15 cm$^3$/g, or about 0.05-0.1 cm$^3$/g and a pore size of about 50-500 nm, about 50-200 nm, or about 50-100 nm. This porosity can allow the powder aggregates/particles to breakdown during use. In addition, these porosities (and densities) can allow the calcined powder to later be milled into the specific particle size distributions described below. As such, the material characteristics described above can allow the creation of the particle size distribution described below.

Milling Alpha Alumina Powder to Specific Size Distribution

In order to quickly enable high removal rate with undiminished aesthetic quality when used in abrasive polishes, Applicants have discovered a specific particle size distribution of the alumina powder that can be used in abrasive polishes. The specific particle size distribution Applicants discovered can provide the performance benefits to abrasive polishes due to having particles/aggregates of particles on a large scale. The coarser particulate aggregates can provide high removal while the smaller particles and aggregates (and eventually individual crystallites) can provide the in-situ coarse scratch removal such that the finish can be maintained. In other words, the large particle aggregates can provide high removal first and then the smaller particles (or broken down aggregates) can provide the desired finish.

The particles in the milled alumina powder can include particles with a size of about 0.1 microns to about 200 microns. The particle size distribution of the milled alumina powder can have a D5 of about 0.01-5 microns, about 0.05-3 microns, about 0.75-2 microns, or about 0.1-1 microns. The particle size distribution of the milled alumina powder can have a D50 of about 5-50 microns, about 10-45 microns, about 5-20 microns, about 7.5-17.5 microns, or about 10-15 microns. In some embodiments, the particle size distribution of the milled alumina powder can have a D50 of less than about 50 microns, about 40 microns, about 30 microns, or about 20 microns. The particle size distribution of the milled alumina powder can have a D95 of about 30-120 microns, about 60-150 microns, about 65-110 microns, about 70-105 microns, or about 75-100 microns. In some embodiments, the particle size distribution of the milled alumina powder can have a D95 of less than about 150 microns, about 100 microns, or about 75 microns. In addition, the particle size distribution of the milled alumina powder can have a D0 of about 0.1-1 micron, about 0.001-0.5 microns, about 0.005-0.3 microns, or about 0.01-0.2 microns and/or a D100 of about 65-200 microns, about 75-225 microns, about 90-210 microns, or about 100-200 microns. In some embodiments, the particle size distribution of the milled alumina powder can have a D100 of less than about 200 microns, about 150 microns, or about 100 microns. This wide distribution can provide a rapid cut rate as abrasive particles in an abrasive polish while maintaining the ability to remove coarse scratches due to the powder having a wide size range. In addition, as the milled alumina powder is continued to be used as a polish, the smaller particles in the powder can provide a better finish that can transition a user more easily into the next step of the polishing process.

The particle size distributions described above can be obtained by milling the calcined alumina powder. Various devices can be used in the milling of the calcined alumina powder including a vertical agitator, a horizontal agitator, a roll mill, a jet mill, or a planetary mill, among others. In addition, the milling can take place in a wet or dry process.

For example, a wet process can include using a vertical agitator that employs a spindle and fine media. The ratio of media:powder in the vertical agitator can be about 2:1, 3:1, 5:1, or 10:1. The controlled rpm of the vertical agitator can be about 100-1500 rpm, about 150-1250 rpm, or about 200-1000 rpm. In addition, surfactants can be used in the vertical agitator to potentially control zetapotential and dispersion.

Another example of a wet milling process is a horizontal agitator mill. Like the vertical agitator described above, the controlled rpm can be about 100-1500 rpm, about 150-1250 rpm, or about 200-1000 rpm and surfactants can be used to potentially control zetapotential and dispersion.

Examples of a dry milling process include a roll mill and a jet mill. A roll mill can include media and powder of different loadings. In addition, the RPM of rolling can alter.

A jet mill can mill particles using air-impingement impact of particles. In addition, an air-classifier can be employed with the jet mill to control the distribution size of the particles carefully. Furthermore, a planetary mill can be used which relies on rotational impact milling of powders in ceramic containers containing media.

In some embodiments, the milled alumina powder can be placed in a slurry. In some embodiments, the slurry can include the milled powder and a fluid. In some embodiments, the fluid can be water or other fluid the milled powder can be suspended within.

As stated above, the milled alumina powders described herein can be used as an abrasive polish. An abrasive polish can include the milled alumina powder, rheological modifiers, lubricants, suspension aids, stabilizers, dispersants, and/or surfactants. In some embodiments, the rheological modifiers, the surfactants, the dispersants, the stabilizers, the suspension aids, and the lubricants can be abrasive particle rheological modifiers, abrasive particle surfactants, abrasive particle, dispersants, abrasive particle, stabilizers, abrasive particle suspension aids, and abrasive particle lubricants. In some embodiments, the abrasive polish can include the milled alumina powder and at least one of a dispersant, a surfactant, a stabilizer, a rheology modifier, and a suspension aid. In some embodiments, an abrasive polish can be made by adding the milled alumina powder and at least one of a rheological modifier, a lubricant, a suspension aid, a stabilizer, a dispersant, and a surfactant to a container; then mixing the components together.

These abrasive polishes can be used on clear coats and/or hardcoats for various automotives (e.g., cars, boats, airplanes, etc.). More specifically, these abrasive polishes can be used in a coarse removal step to level the clear coat or hardcoat of the automotive. In some embodiments, the abrasive polishes can be used in a first coarse removal step to level the clear coat or hardcoat of the automotive and in a second finishing step to obtain a high finish.

The performance of an abrasive polish can be measured as a removal rate and time to reach appropriate aesthetic appeal as measured by gloss and haze.

EMBODIMENTS

The following embodiments, numbered consecutively from 1 through 21 provide various non-limiting embodiments described herein.

Embodiment 1

An alumina powder comprising at least 75 wt % alpha alumina, wherein the alumina powder has a specific surface area of 5-12 $m^2/g$ and a particle size distribution with a D5 of 0.01-5 microns, a D50 of 5-50 microns, and a D95 of 30-120 microns, wherein particles in the alumina powder comprise a plurality of crystallites having an average primary crystallite size of less than 2 microns.

Embodiment 2

The alumina powder of embodiment 1, wherein the alumina powder comprises at least 85 wt % alpha alumina.

Embodiment 3

The alumina powder of any of embodiments 1-2, wherein the particle size distribution of the alumina powder has a D5 of 0.1-1 microns, a D50 of 10-45 microns, and a D95 of 60-150 microns.

Embodiment 4

The alumina powder of any of embodiments 1-3, wherein the particle size distribution has a D0 of 0.1-1 microns.

Embodiment 5

The alumina powder of any of embodiments 1-4, wherein the particle size distribution has a D100 of 65-200 microns.

Embodiment 6

The alumina powder of any of embodiments 1-5, wherein the surface area of the alumina powder is 7-10 $m^2/g$.

Embodiment 7

The alumina powder of any of embodiments 1-6, wherein the alumina powder has a density of at least 3 $g/cm^3$.

Embodiment 8

The alumina powder of embodiment 7, wherein the density is at least 3.8 $g/cm^3$.

Embodiment 9

The alumina powder of any of embodiments 1-8, wherein the average primary crystallite size is 0.1-0.5 microns.

Embodiment 10

The alumina powder of any of embodiments 1-9, wherein each of the crystallites have a primary crystallite size of less than 2 microns.

Embodiment 11

The alumina powder of embodiment 10, wherein each of the crystallites have a primary crystallite size of less than 1 micron.

Embodiment 12

The alumina powder of any of embodiments 1-11, wherein at least a portion of the calcined alumina powder has a pore volume of 0.001-0.5 $cm^3/g$ and a pore size of about 2-50 nm.

Embodiment 13

The alumina powder of any of embodiments 1-12, wherein at least a portion of the calcined alumina powder has a pore volume of 0.01-0.2 $cm^3/g$ and a pore size of 50-500 nm.

Embodiment 14

The alumina powder of any of embodiments 1-13, wherein the particle size distribution has a D100 of less than 200 microns.

Embodiment 15

A method of forming a milled alumina powder, the method comprises: calcining a powder comprising aluminum hydroxide at a temperature of 800-1500° C. to form an alumina powder comprising at least 75 wt % alpha alumina; and milling the alumina powder to a have a particle size distribution with a D5 of 0.01-5 microns, a D50 of 5-50 microns, and a D95 of 30-120 microns to form the milled alumina powder.

Embodiment 16

The method of embodiment 15, wherein the temperature is 900-1400° C.

Embodiment 17

The method of embodiment 16, wherein the temperature is 1100-1300° C.

Embodiment 18

The method of any of embodiments 15-17, wherein the powder comprising aluminum hydroxide is calcined for 1-48 hours.

Embodiment 19

The method of any of embodiments 15-18, wherein the powder comprising aluminum hydroxide is calcined in a rotary kiln, a static kiln, or a pusher kiln.

Embodiment 20

The method of any of embodiments 15-19, wherein the alumina powder comprises at least 85 wt % alpha alumina.

Embodiment 21

The method of any of embodiments 15-20, wherein the alumina powder is milled to a have a particle size distribution with a D5 of 0.1-1 microns, a D50 of 10-45 microns, and a D95 of 60-150 microns.

Embodiment 22

The method of any of embodiments 15-21, wherein the alumina powder is milled to a have a particle size distribution with a D0 of 0.1-1 microns.

Embodiment 23

The method of any of embodiments 15-22, wherein the alumina powder is milled to a have a particle size distribution with a D100 of 65-200 microns.

Embodiment 24

The method of any of embodiments 15-23, wherein the particle size distribution has a D100 of less than 200 microns.

Embodiment 25

The method of any of embodiments 15-24, wherein the alumina powder is milled using a vertical agitator, a horizontal agitator, a roll mill, a jet mill, or a planetary mill.

Embodiment 26

A slurry comprising the alumina powder of any one of embodiments 1-14 and at least one fluid for suspending the alumina powder.

Embodiment 27

An abrasive polish comprising the alumina powder of any one of embodiments 1-14 and at least one of a dispersant, a surfactant, a stabilizer, and a rheology modifier.

Embodiment 28

A method of making an abrasive polish comprising: adding the alumina powder of any one of embodiments 1-14 to a container; adding at least one of a dispersant, a surfactant, a stabilizer, and a rheology modifier to the container; and mixing the alumina powder and the at least one of the dispersant, the surfactant, the stabilizer, and the rheology modifier.

Testing Methods

Unless otherwise specified herein, reference to any of the following characteristics below in the description above and the claims appended hereto refer to values obtained using the following tests:

Particle size distribution can be measured by a Laser Scattering method using a Horiba LA950. The powder samples can be analyzed for particle size using a Horiba LA-950 laser scattering particle size analyzer. Deionized (DI) water was used as the circulation bath medium and a refractive index of 1.66 with an imaginary value of 0.0i was used. The refractive index for water used was 1.333. The sample was pre-dispersed prior to analysis by introducing 0.5 g of sample into 30 mL of DI water in a glass beaker. The pH of the DI water was set to 6.4. The beaker was kept stationary and the material was sonicated for 2 minutes using a Sonics and Materials Inc. Vibracel brand processer with a model CV334 0.5 inch diameter horn and a model VC750 power source (750W). The power source was used at 50% amplitude. The Horiba LA950 analyzer was prepared for analysis with DI water of a pH 6.4 and by rinsing twice with additional DI water of a pH of 6.4 and then backfilling. The analyzer was aligned and blanked, after which the circulation and agitation were started. The circulation and agitation were kept at 15 and 5, respectively. The pre-dispersed sample was slowly introduced into the analyzer via transfer pipet until a transmittance level between 85 and 90% was achieved. The sample was allowed to circulate for 15 seconds prior to acquisition of the measurement.

Specific surface area can be measured by the BET method.

Density can be measured by helium pycnometry.

The weight percent of the phase of the aluminum oxide can be measured by XRD Reitveld Refinement Method.

Primary crystallite size can be measured by image analysis of high resolution SEM micrographs. For Example, the single FIGURE illustrates a high resolution SEM micrograph showing the microstructure of an alumina powder described herein.

Pore volume and pore size can be measured by nitrogen adsorption isotherm method.

This application discloses several numerical ranges in the text and FIGURE. The numerical ranges disclosed inherently support any range or value within the disclosed numerical ranges, including the endpoints, even though a precise range limitation is not stated verbatim in the specification because this disclosure can be practiced throughout the disclosed numerical ranges.

The above description is presented to enable a person skilled in the art to make and use the disclosure, and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein. Finally, the entire disclosure of the patents and publications referred in this application are hereby incorporated herein by reference.

The invention claimed is:

1. An alumina powder comprising at least 75 wt % alpha alumina, wherein the alumina powder has:
    a specific surface area of 5-12 $m^2/g$; and
    a particle size distribution with a D5 of 0.01-5 microns, a D50 of 5-50 microns, and a D95 of 30-120 microns, wherein particles in the alumina powder comprise a plurality of crystallites having an average primary crystallite size of less than 2 microns.

2. The alumina powder of claim 1, wherein the alumina powder comprises at least 85 wt % alpha alumina.

3. The alumina powder of claim 1, wherein the particle size distribution of the alumina powder has a D5 of 0.1-1 microns, a D50 of 10-45 microns, and a D95 of 60-150 microns.

4. The alumina powder of claim 1, wherein the particle size distribution has a D0 of 0.1-1 microns.

5. The alumina powder of claim 1, wherein the particle size distribution has a D100 of 65-200 microns.

6. The alumina powder of claim 1, wherein the surface area of the alumina powder is 7-10 $m^2/g$.

7. The alumina powder of claim 1, wherein the alumina powder has a density of at least 3 $g/cm^3$.

8. The alumina powder of claim 7, wherein the density is at least 3.8 $g/cm^3$.

9. The alumina powder of claim 1, wherein the average primary crystallite size is 0.1-0.5 microns.

10. The alumina powder of claim 1, wherein each of the crystallites have a primary crystallite size of less than 2 microns.

11. The alumina powder of claim 10, wherein each of the crystallites have a primary crystallite size of less than 1 micron.

12. The alumina powder of claim 1, wherein at least a portion of the calcined alumina powder has a pore volume of 0.001-0.5 $cm^3/g$ and a pore size of about 2-50 nm.

13. The alumina powder of claim 1, wherein at least a portion of the calcined alumina powder has a pore volume of 0.01-0.2 $cm^3/g$ and a pore size of 50-500 nm.

14. The alumina powder of claim 1, wherein the particle size distribution has a D100 of less than 200 microns.

15. A method of forming a milled alumina powder, the method comprises:
    calcining a powder comprising aluminum hydroxide at a temperature of 800-1500° C. to form an alumina powder comprising at least 75 wt % alpha alumina; and
    milling the alumina powder to a have a particle size distribution with a D5 of 0.01-5 microns, a D50 of 5-20 microns, and a D95 of 65-110 microns to form the milled alumina powder.

16. The method of claim 15, wherein the temperature is 900-1400° C.

17. The method of claim 16, wherein the temperature is 1100-1300° C.

18. The method of claim 15, wherein the powder comprising aluminum hydroxide is calcined for 1-48 hours.

19. The method of claim 15, wherein the powder comprising aluminum hydroxide is calcined in a rotary kiln, a static kiln, or a pusher kiln.

20. The method of claim 15, wherein the alumina powder comprises at least 85 wt % alpha alumina.

21. The method of claim 15, wherein the alumina powder is milled to a have a particle size distribution with a D5 of 0.1-1 microns, a D50 of 10-15 microns, and a D95 of 75-100 microns.

22. The method of claim 15, wherein the alumina powder is milled to a have a particle size distribution with a D0 of 0.01-0.2 microns.

23. The method of claim 15, wherein the alumina powder is milled to a have a particle size distribution with a D100 of 100-200 microns.

24. The method of claim 15, wherein the alumina powder is milled using a vertical agitator, a horizontal agitator, a roll mill, a jet mill, or a planetary mill.

25. The method of claim 15, wherein the particle size distribution has a D100 of less than 200 microns.

26. A slurry comprising the alumina powder of claim 1, and at least one fluid for suspending the alumina powder.

27. An abrasive polish comprising the alumina powder of claim 1, and at least one of a dispersant, a surfactant, a stabilizer, and a rheology modifier.

28. A method of making an abrasive polish comprising:
adding the alumina powder of claim 1 to a container;
adding at least one of a dispersant, a surfactant, a stabilizer, and a rheology modifier to the container; and
mixing the alumina powder and the at least one of the dispersant, the surfactant, the stabilizer, and the rheology modifier.

* * * * *